June 10, 1924.                     1,497,208
W. R. CALVERT, SR
POTHOOK
Original Filed Dec. 15, 1921
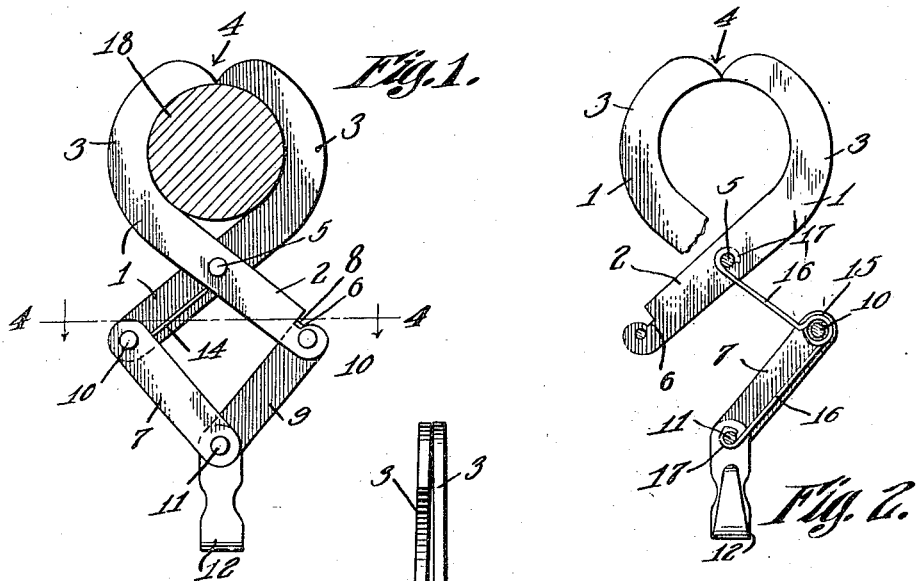
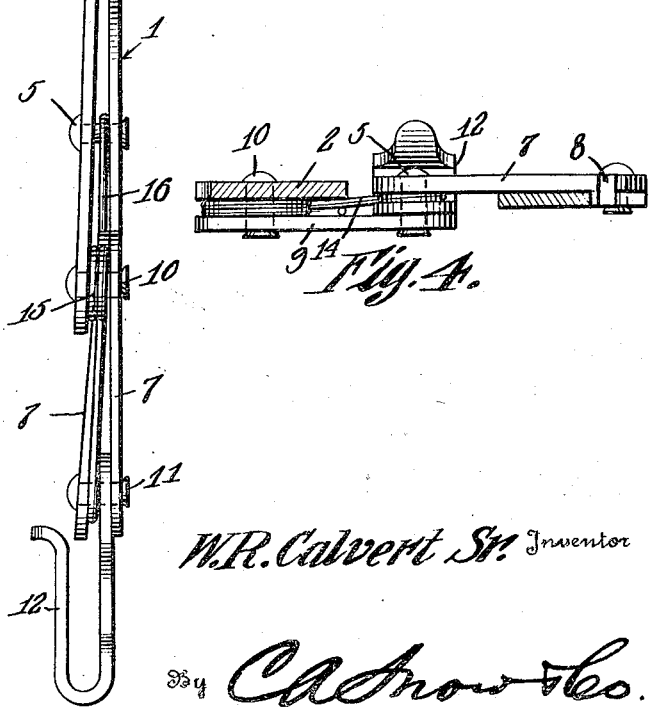
W. R. Calvert Sr. Inventor Patented June 10, 1924.

1,497,208

UNITED STATES PATENT OFFICE.

WALTER R. CALVERT, SR., OF LOUISVILLE, KENTUCKY.

POTHOOK.

Application filed December 15, 1921, Serial No. 522,607. Renewed November 15, 1923.

*To all whom it may concern:*

Be it known that I, WALTER R. CALVERT, Sr., a citizen of the United States, residing at Louisville, in the county of Jefferson and State of Kentucky, have invented a new and useful Pothook, of which the following is a specification.

This invention aims to provide a simple means whereby a paint pot or the like may be suspended detachably from a ladder or other support.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed it being understood that, within the scope of what is claimed, changes in the precise embodiment of the invention shown can be made without departing from the spirit of the invention.

In the drawings:—

Figure 1 shows in elevation, a device constructed in accordance with the invention, the same being mounted on the rung of a ladder; Figure 2 is an elevation showing the opposite side of the structure from that delineated in Figure 1, parts being broken away; Figure 3 is an elevation wherein the device is viewed edgewise; Figure 4 is a section on the line 4—4 of Figure 1.

The device forming the subject matter of this application comprises arms 1 and 2 terminating in cooperating hooks 3, the ends of which are beveled to define an entering throat 4. At their point of crossing, the arms 1 and 2 are connected by a pivot element 5. In the upper edge of the arm 2, a seat 6 is formed. Links 7 and 9 are provided, the inner ends of the links being connected by pivot elements 10 to the arms 1 and 2. The link 9 has a finger 8 adapted to be received in the seat 6 of the arm 2. The outer ends of the links 7 and 9 are connected by a pivot element 11 whereon a suspension element 12, such as a hook, is hung. The numeral 14 denotes a spring which may be omitted if desired. The intermediate portion of the spring 14 is engaged at 15 around the pivot element 10 which connects the arm 1 with the link 7, the spring comprising diverging parts 16 terminating in hooks 17, one of which is engaged around the pivot element 5, the other of which is engaged around the pivot element 11.

The hooks 3 may be engaged around the rung 18 of a ladder, as shown in Figure 1, or, if desired, the ends of the hooks 3 may be engaged with the platform of a step ladder, with the upright bar of a window sash, or with a support of any other desired kind. A paint pot (not shown) is hung on the hook 12, the weight of the paint pot serving to keep the hooks 3 in place, assuming that the spring 14 is not used. The spring, however, aids in holding the hooks in the position shown in Figure 3. It is to be observed that the bills of the hooks 3 are not in alinement. The ends or bills of the hooks 3 do not, therefore, prevent the hooks from closing beyond the position shown in Figure 1. The hooks, however, cannot close beyond the position shown in Figure 1, because the finger 8 on the link 9 cooperates with the seat 6 of the arm 2, as shown in Figure 1. Because the hooks 3 cannot close together, beyond the position shown in Figure 1, the throat 4 is so disposed that when the same is pushed against an object of any kind, such as the rung 18, the hooks 3 will open to receive the rung or other object thereby permitting the hooks 3 to be engaged therewith.

What is claimed is:—

1. A device of the class described, comprising crossed arms having cooperating hooks; a pivot element connecting the arms at their place of crossing; links having their inner ends pivoted to the arms and having their outer ends pivotally united, one of the links and one of the arms being provided with interengaging elements, independent of the ends of the hooks, for limiting the movement of the hooks toward each other; spring means for moving the ends of the hooks toward each other; and a suspension element carried by one of the links.

2. A device of the class described comprising crossed arms having cooperating hooks; a first pivot element connecting the arms at their place of crossing; links; second pivot elements connecting the inner ends of the links with the arms; a third pivot element connecting the outer ends of the links; a suspension member carried by the third pivot element; and a spring constituting means for moving the hooks toward each other, the spring being housed behind one of the arms and one of the links, the spring being engaged intermediate its ends with one of the second pivot elements, and being engaged at its ends with the first and third pivot elements.

In testimony that I claim the foregoing as my own, I have hereto affixed my signature in the presence of two witnesses.

WALTER R. CALVERT, Sr.

Witnesses:
A. H. GOLDSTEIN,
J. R. WORTHINGTON.